(12) United States Patent
Yang et al.

(10) Patent No.: US 10,217,059 B2
(45) Date of Patent: Feb. 26, 2019

(54) METHOD AND SYSTEM FOR GENERATING NATURAL LANGUAGE TRAINING DATA

(71) Applicant: Maluuba Inc., Toronto (CA)

(72) Inventors: Siwei Yang, Waterloo (CA); Wilson Hsu, Waterloo (CA); Zhiyuan Wu, Waterloo (CA)

(73) Assignee: Maluuba Inc., Waterloo (CA)

( * ) Notice: Subject to any disclaimer, the term of this patent is extended or adjusted under 35 U.S.C. 154(b) by 0 days.

(21) Appl. No.: 14/171,938

(22) Filed: Feb. 4, 2014

(65) Prior Publication Data

US 2015/0220511 A1    Aug. 6, 2015

(51) Int. Cl.
| | |
|---|---|
| G06N 99/00 | (2010.01) |
| G06F 17/24 | (2006.01) |
| G06F 17/28 | (2006.01) |
| G06F 17/30 | (2006.01) |

(52) U.S. Cl.
CPC ........ *G06N 99/005* (2013.01); *G06F 17/248* (2013.01); *G06F 17/30684* (2013.01)

(58) Field of Classification Search
None
See application file for complete search history.

(56) References Cited

U.S. PATENT DOCUMENTS

| | | | | |
|---|---|---|---|---|
| 8,694,305 B1 * | 4/2014 | Grove | ............ | G06F 17/28 704/1 |
| 2007/0162275 A1 * | 7/2007 | Ablondi | ............ | G06F 17/30569 704/9 |
| 2008/0126078 A1 * | 5/2008 | Starkie | ............ | G06F 17/274 704/9 |
| 2009/0089045 A1 * | 4/2009 | Lenat | ............ | G06F 17/2785 704/9 |
| 2011/0010367 A1 * | 1/2011 | Jockish et al. | ............ | 707/733 |
| 2011/0231347 A1 * | 9/2011 | Xu | ............ | G06F 17/30864 706/12 |
| 2011/0246182 A1 * | 10/2011 | Allen | ............ | G06F 17/248 704/9 |
| 2014/0365880 A1 * | 12/2014 | Bellegarda | ............ | G06F 17/3097 715/261 |

FOREIGN PATENT DOCUMENTS

WO    WO 2014201844 A1 * 12/2014    ....... G06F 17/30684

* cited by examiner

*Primary Examiner* — Richa Mishra

(57) ABSTRACT

Provided is a system, method and computer-readable medium for generating data that may be used to train models for a natural language processing application. A system architect creates a plurality of sentence patterns that include entity variables and initiates sentence generation. Each entity is associated with one or more entity data sources. A language generator accepts the sentence patterns as inputs, and references the various entity sources to create a plurality of generated sentences. The generated sentences may be associated with a particular class and therefore used to train one or more statistical classification models and entity extraction models for associated models. The sentence generated process may be initiated and controlled using a user interface displayable on a computing device, the user interface in communication with the language generator module.

18 Claims, 9 Drawing Sheets

METHOD AND SYSTEM FOR GENERATING NATURAL LANGUAGE TRAINING DATA

FIELD OF THE INVENTION

The present disclosure relates to natural language processing, and more particularly, to a system, method and computer program product for building and improving classification models.

BACKGROUND

A known approach in creating classification models is to collect and label data manually. The data is typically organized as belonging to a particular class, and entities within the data are typically labeled in a predetermined fashion. Models can then be trained to classify incoming data as belonging to one or more of the classes and used to extract entities from incoming data.

Unfortunately, this approach has several shortcomings. Models often require large amounts of data to become accurate above an acceptable error rate, and collecting and labeling data manually (i.e. by individuals) is expensive and time consuming. In addition, individuals may differ in how they label data leading to data that is labeled inconsistently and even incorrectly.

SUMMARY

Broadly speaking, the present subject matter relates to a system, computer-implemented method, and computer-readable medium for generating natural language training data to train one or more computational models in a computer system. The models may be statistical models based on one or more technologies such as random forest, Naïve Bayes, Conditional Random Fields, and so forth. In one aspect, the models are components within a Natural Language Processing (NLP) system configured to accept natural language queries as user input, and to provide information or services to users based on intention derived by an NLP engine.

In various aspects, an NLP system may be created or expanded by first identifying a set of classes into which natural language inputs may be classified. Classes (also referred to herein as categories and domains) are general fields of action and information. Example classes include weather, stocks, social media, movies, restaurants, and so forth. Once a set of classes has been identified, a system architect may identify one or more possible commands that are to be supported within each class. For example, a given NLP application may support commands associated with restaurants, and support particular restaurant commands for locating a restaurant based on food type (e.g. "Find me a Chinese restaurant"), location (e.g. "Find me a restaurant in New York City"), price (e.g. "Find me a cheap place to eat") and/or commands having combinations of food type, location and price. The NLP application may employ a first set of models in order to classify incoming queries as belonging to a domain such as "restaurant", a second set of classifiers (e.g. models) to identify the particular command intended by the user (e.g. find restaurant by food type), and a third set of models to extract the entities (e.g. food type, location, price) from a user's query.

Once the set of classes, particular commands, and entities have been identified for a particular application, an architect may employ the language generator disclosed herein to generate data that may be used to train the aforementioned models. In various embodiments, an architect generates one or more natural language patterns for each of the supported commands. The architect may also wish to generate one or more patterns that contain each entity identified, as well as combinations of entities that the architect foresees as popular. A data source is identified for each entity in the patterns, and each data source is associated with each entity. An architect may enter the number of sentences that the architect wishes to generate. The number may be a total number for all classes, the total number for each class and/or command within a class, the total number for each entity, or the total number for each pattern created. A language generator is used to create the number of sentences (e.g. queries) desired. Once the desired number of sentences has been created, the architect may direct the data to a training module so that the associated statistical models may be created (trained). Finally, the architect may deploy the new models with the software application for interaction with users.

The data generation process disclosed herein may be used in conjunction with one or more data optimization techniques and clustering techniques to improve the performance of the models and/or to create additional models.

There is provided a computer-implemented method for generating training data for training one or more models implemented in a natural language processing system. The method comprises storing one or more sentence patterns, wherein each sentence pattern comprises one or more entity variables, each entity variable comprising a definition to replace the entity variable with an instance of an entity matching the definition; accessing one or more entity sources, wherein each entity source comprises one or more entities to replace the one or more entity variables in accordance with the respective definition; generating a plurality of sentences by replacing respective entity variables in each sentence pattern with one or more entities in accordance with the definitions; and providing the plurality of sentences to train the one or more models.

The plurality of sentences may be the maximum number of sentences that can be generated based on the one or more sentence patterns, the one or more entity variables, and the one or more entities available from the one or more entity sources.

The plurality of sentences may match one or more input queries of a single class.

The method may further comprise using the plurality of sentences to train one or more models to be implemented in a natural language processing system.

Generating the plurality of sentences may comprise randomly selecting a sentence pattern from the one or more sentence patterns and, for each entity variable in the sentence pattern, randomly selecting an entity from the one or more entities matching the definition of the entity variable.

The method may further comprise storing the plurality of sentences.

The method may comprise providing a user interface to receive input to at least one of: identify the one or more entity sources to be accessed; and define a sentence pattern.

The one or more models may be configured to perform at least one of: classifying an input query into one class of a set of one or more classes, identifying the input query as a specific command, and extracting one or more entities from the input query.

The method may further comprise receiving a dataset of input queries comprising natural language queries; performing clustering on the dataset to cluster the respective input queries; and adding selected clusters of input queries to the plurality of sentences to train one or more models.

There is provided a non-transitory computer-readable medium for generating training data for training one or more models implemented in a natural language processing system, the computer-readable medium comprising instructions that, when executed, cause a computer to perform operations according to one of the methods described above.

There is provided a computer system for generating training data for training one or more models implemented in a natural language processing system. The system comprises one or more processors, a memory coupled to the one or more processors, and storing instructions and data for configuring the computer to: store one or more sentence patterns, wherein each sentence pattern comprises one or more entity variables, each entity variable comprising a definition to replace the entity variable with an instance of an entity matching the definition; access one or more entity sources, wherein each entity source comprises one or more entities to replace the one or more entity variables in accordance with the respective definition; generate a plurality of sentences by replacing respective entity variables in each sentence pattern with one or more entities in accordance with the definitions; and provide the plurality of sentences to train the one or more models.

The computer system may be further configured to provide a user interface to receive input to, at least one of: identify the one or more entity sources to be accessed; and receive input to define a sentence pattern.

The computer system may be further configured to receive a dataset of input queries comprising natural language queries; perform clustering on the dataset to cluster the respective input queries; and add selected clusters of input queries to the plurality of sentences to train one or more models.

Other aspects and advantages of the present subject matter will become apparent from the following detailed description taken in conjunction with the accompanying drawings which illustrate, by way of example, the principles of the claimed subject matter.

BRIEF DESCRIPTION OF THE DRAWINGS

Exemplary embodiments of the subject matter will now be described in conjunction with the following drawings, by way of example only, in which.

For convenience, like reference numerals refer to like parts and components in the various drawings.

DETAILED DESCRIPTION

Figure 1:
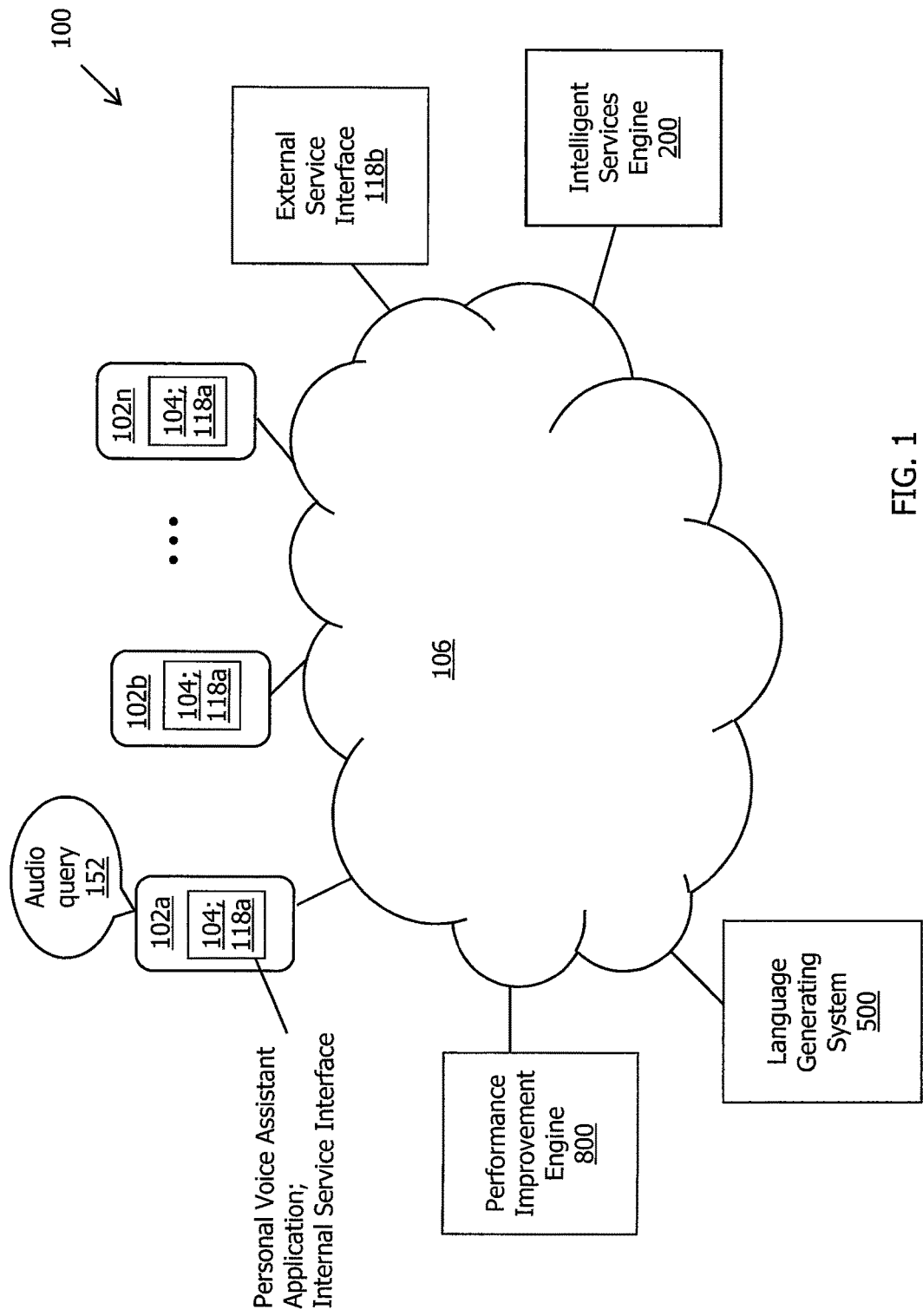
FIG. 1 is a block diagram of one embodiment of a networked environment of an intelligent services engine for providing software services and information to users.

Reference is made to FIG. 1 which illustrates an exemplary networked environment 100 configured to provide services and/or information to users of devices 102a-102n. In one embodiment, a user may utter a voice command (e.g. audio query 152) to an application 104 resident on device 102 (such as a smartphone) which directs the audio query 152 or a text representation thereof over a wireless network 106 (e.g. the Internet, cellular networks, WI-FI, etc.) to an intelligent services engine 200 for processing. The intelligent services engine 200 may include an NLP engine 214 (see FIG. 2) configured to derive the intent of the user and extract relevant entities from the audio query 152. As will be appreciated, many users may simultaneously access the intelligent services engine 200 through devices 102 over a wired network (not shown) and/or wireless network 106.

In some embodiments, intelligent services engine 200 includes one or more computational models 217 (e.g. statistical classification models) implemented by one or more computer processors for classifying the user's input (e.g. audio query 152) into a particular class. Computational models 217 may also be employed to extract entities from the user's input (e.g. audio query 152) which represent particular people, places or things which may be relevant to accomplishing a command or providing information desired by the user. For example, a user may input an audio query 152 such as "Show me the weather forecast for New York City for the weekend" to an NLP system (which may comprise for example application 104, intelligent services engine 200, and associated service interfaces 118) that accepts natural language inputs and supports weather-related queries. The intelligent services engine 200 can use an NLP engine 214 to correctly classify the audio query 152 as relating to the class of "weather" by applying one or more statistical models (e.g. computational models 217). The intelligent services engine 200 may then apply one or more entity extraction models (e.g. computational models 217) to extract relevant additional information from the user's audio query 152 such as the city name (i.e. New York City) and/or the time range (i.e. the "weekend" which can be normalized to a particular date range).

The language generating system 500 disclosed herein may be employed with the NLP system (e.g. application 104, intelligent services engine 200, and associated service interfaces 118) described above to generate natural language training data that may be used to train/retrain computer-implemented computational models 217 configured to recognize the intention of a user embodied in a natural language query (e.g. audio query 152), and to extract relevant entity information from the query. In some embodiments, the language generating system 500 may be used to train new models (e.g. computational models 217) or to improve existing models (e.g. computational models 217) by providing training data based on new patterns of queries (e.g. audio queries 152) inputted by users or created by system architects.

Herein the terms "classes", "categories" and "domains" are used interchangeably and refer to related queries and functionality. For example, a particular NLP system powered by intelligent services engine 200 may support natural language queries (e.g. audio queries 152) relating to weather, stocks, television, news, and music. Such a system supports weather, stocks, television, news and music classes. Users of such a system may ask questions (i.e. input audio queries 152) such as "What is the current weather"; "How is the Dow Jones™ doing today"; "When is 60 Minutes™ on"; "Show me the current news for the NFL™"; "I want to hear some rap music", etc. It may be found, however, that users ask questions about classes that are not supported by the intelligent services engine 200 (e.g. restaurants), or ask questions in a way that the models within the intelligent services engine 200 are unable to process correctly. As an example, some users may ask questions (e.g. input audio queries 152) related to movies such as "What movies are playing this weekend in San Francisco". The language generator (e.g. language generator 502; see FIG. 5) and clustering engine (e.g. clustering engine 802; see FIG. 8) disclosed herein may be used to generate and recognize training data which may improve the performance of and expand the functionality supported by a given NLP system (e.g. application 104, intelligent services engine 200 and associated service interfaces 118).

Figure 2:
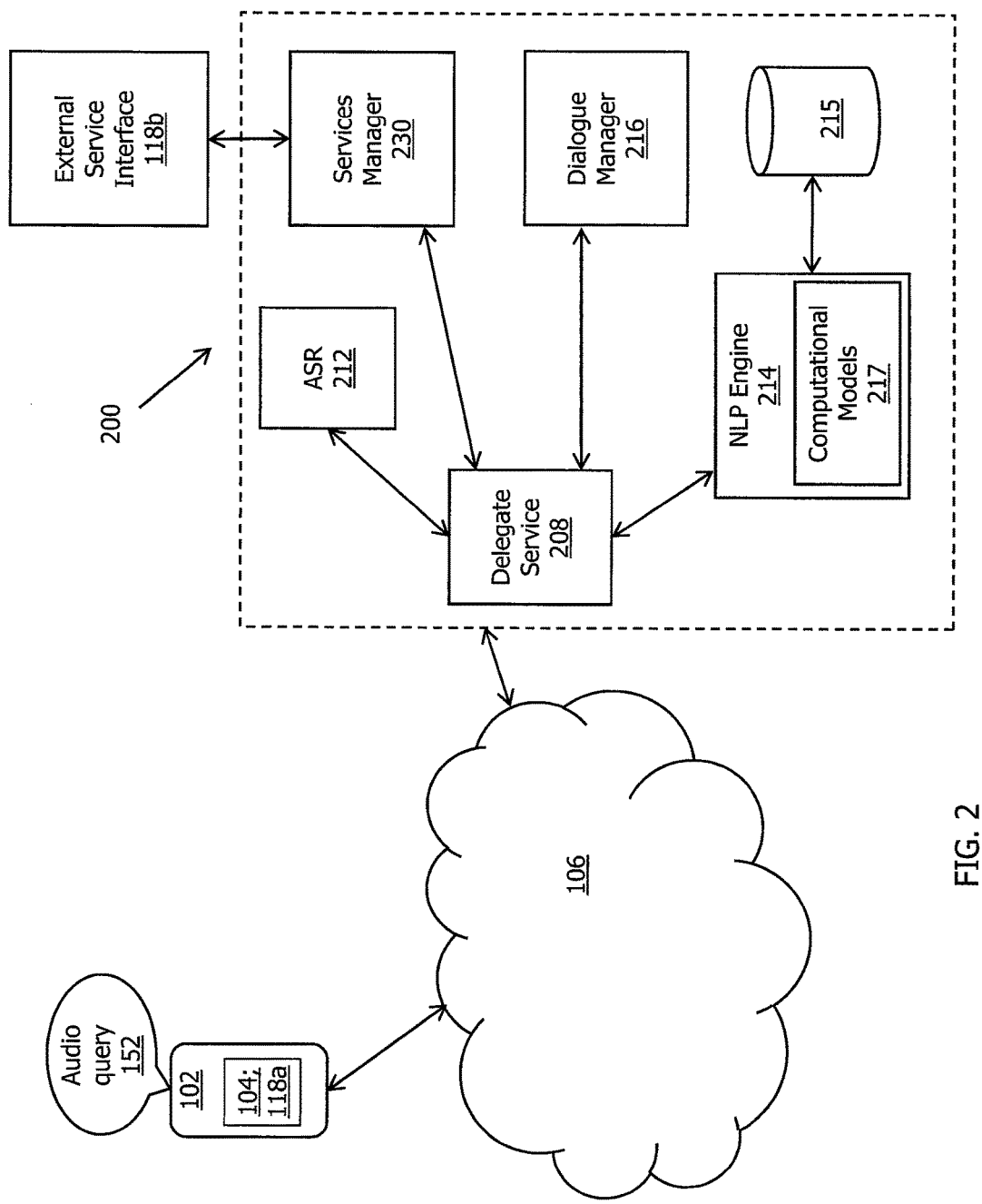
FIG. 2 is a block diagram showing one embodiment of the intelligent services engine of FIG. 1 configured to receive natural language queries from users and to generate responses.

FIG. 2 illustrates a block diagram of one embodiment of the intelligent services engine 200 that may be improved by the sentence generation process/system disclosed herein. The intelligent services engine 200 includes an Automatic Speech Recognition (ASR) module 212 configured to convert an audio command (e.g. audio query 152) into a text representation of the audio command (e.g. audio query 152). The intelligent services engine 200 may include several components/modules that facilitate the processing of audio queries 152, intelligently derive the intention of the user based on audio queries 152 as well as select an appropriate internal or external service (e.g. using service interfaces 118) adapted to perform the requested task or provide the information desired by the user.

The device 102 used to access the intelligent services engine 200 may be for example a laptop or desktop computer, a cellular telephone, a smartphone, a set top box, etc. The intelligent services engine 200 may communicate with an application (e.g. application 104) resident on the device 102, the application 104 providing an interface for accessing the intelligent services engine 200 and for receiving output and results produced by the intelligent services engine 200 and/or external service interfaces 118*b* in communication with the intelligent services engine 200.

By using and interacting with intelligent services engine 200, a user can obtain services and/or control their device 102 (or another computing device 300) by expressing commands (e.g. audio queries 152) to the application 104. For example, a user may search the Internet for information by expressing an appropriate audio query 152 into the device 102, for example, "What is the capital city of Germany?" The application 104 receives the audio query 152 by interfacing with the microphone(s) (e.g. microphone 336) on the device 102, and may direct the audio query 152 to the intelligent services engine 200 over wireless network 106. Modules of intelligent services engine 200 such as delegate service 208, ASR 212, NLP engine 214, dialogue manager 216, services manager 230, etc. cooperate to convert the audio query 152 into a text query, derive the intention of the user, and perform commands according to the derived intention of the user as embodied in the audio query 152. In some exemplary embodiments, the user may input a command via expressing the query in audio form and/or by using other input modes such as touchscreen 330, keyboard 350, mouse (not shown) and so forth. One or more databases 215 may be accessible to electronically store information as desired, such as statistical models (e.g. computational models 217), natural language rules, regular expressions, rules, gazetteers, entity lists, synsets (sets of synonyms), and so forth.

In various embodiments, a user may interact with application 104 to control other items such as televisions, appliances, toys, automobiles, etc. In these applications 104, an audio query 152 is provided to intelligent services engine 200 in order to derive the intent of the user as well as to extract important entities. For example, a user may express an audio query 152 such as "change the channel to ESPN" to an application 104 configured to recognize the intent of the user with respect to television control. The audio query 152 may be routed to intelligent services engine 200 which may interpret (using one or more statistical models, e.g. computational models 217) the intent of the user as relating to changing the channel and extract entities (using one or more statistical models, e.g. computational models 217) such as ESPN™. The intelligent services engine 200 may be configured to directly send an instruction to the television (or set-top box in communication with the television) over a wireless network 106 to change the channel or may send a response to the device 102 over a wireless network 106, in which case the device 102 may control the television (or set-top box) directly using one of a variety of communication technologies such as Wi-Fi, infrared communication, etc.

Delegate service 208 may operate as a gatekeeper and load balancer for all requests received at intelligent services engine 200 from device 102. The delegate service 208 is configured to route commands to the appropriate components (e.g. ASR 212, NLP engine 214, services manager 230, dialogue manager 216, etc.) and to manage communication between the components of intelligent services engine 200. ASR module 212 is configured to convert audio queries 152 into the corresponding text representation. NLP engine 214 typically receives the text representation of the audio query 152 from ASR module 212 (sometimes via delegate service 208) and applies one or more models (e.g. computational models 217) to determine which category the audio query 152 belongs to. A second round (or additional rounds) of classification may be applied to determine the particular command intended by the user once the initial classification is determined. For example, for the audio query 152 "Create a meeting for 3 pm tomorrow with Dave", the initial classification by NLP engine 214 may determine that the command relates to the calendar category, and subsequent classifications may determine that the user wishes to create a calendar meeting. One or more iterations of entity extraction may also be applied to the query to extract key pieces of information about the meeting to create such as the time (i.e. 3 pm) and the date (i.e. tomorrow, which can be normalized from the current date).

A services manager 230 may be a component within intelligent services engine 200 in order to accomplish the task/provide information requested by the user. In various embodiments, the services manager 230 interfaces with third-party application programming interfaces (APIs) (e.g. external service interfaces 118*b*) such as movie content providers, weather content providers, news providers, or any other content provider that may be integrated with intelligent services engine 200 via an API, data feed, and the like. For the calendar example given above, the services manager 230 may interface with a system API (e.g. internal service interface 118*a*) such as a calendar API provided by the operating system of the device 102. Once the services manager 230 has identified the appropriate API (using the information provided by NLP engine 214 and a list of available APIs), the service manager 230 calls the appropriate API (e.g. service interfaces 118) according to a predetermined format and completes the task intended by the user.

A dialogue manager 216 may also be provided with intelligent services engine 200 in order to generate a conversational interaction with the user of device 102 and also to generate a response to be viewed on the user interface of device 102 when a user makes a request (e.g. via audio query 152). As will be appreciated, intelligent services engine 200 may also include and/or otherwise interface with one or more databases (e.g. database 215) that store information in electronic form for use by the intelligent services engine 200. Information that may be stored in database 215 includes a history of user commands (e.g. audio query 152) and results, available lists of APIs (e.g. service interfaces 118) and their associate API keys and transaction limits, user IDs and passwords, cached results, phone IDs, versioning information, etc.

It will be appreciated that intelligent services engine 200 may communicate with device 102 over any communications network 106 such as the Internet, Wi-Fi, cellular networks, and the like. Intelligent services engine 200 may be a distributed system in which its components (e.g. delegate service 208, ASR 212, NLP engine 214, dialogue manager 216, services manager 230, etc.) reside on a variety of computing devices (e.g. computing device 300) that are executed by one or more computer processors. Furthermore, each component (e.g. delegate service 208, ASR 212, NLP engine 214, dialogue manager 216, services manager 230, etc.) may be horizontally scalable in a service-oriented infrastructure manner such that each component may comprise multiple virtual services instantiated on one or more services according to the load balancing requirements on any given service at a particular time.

Figure 3:
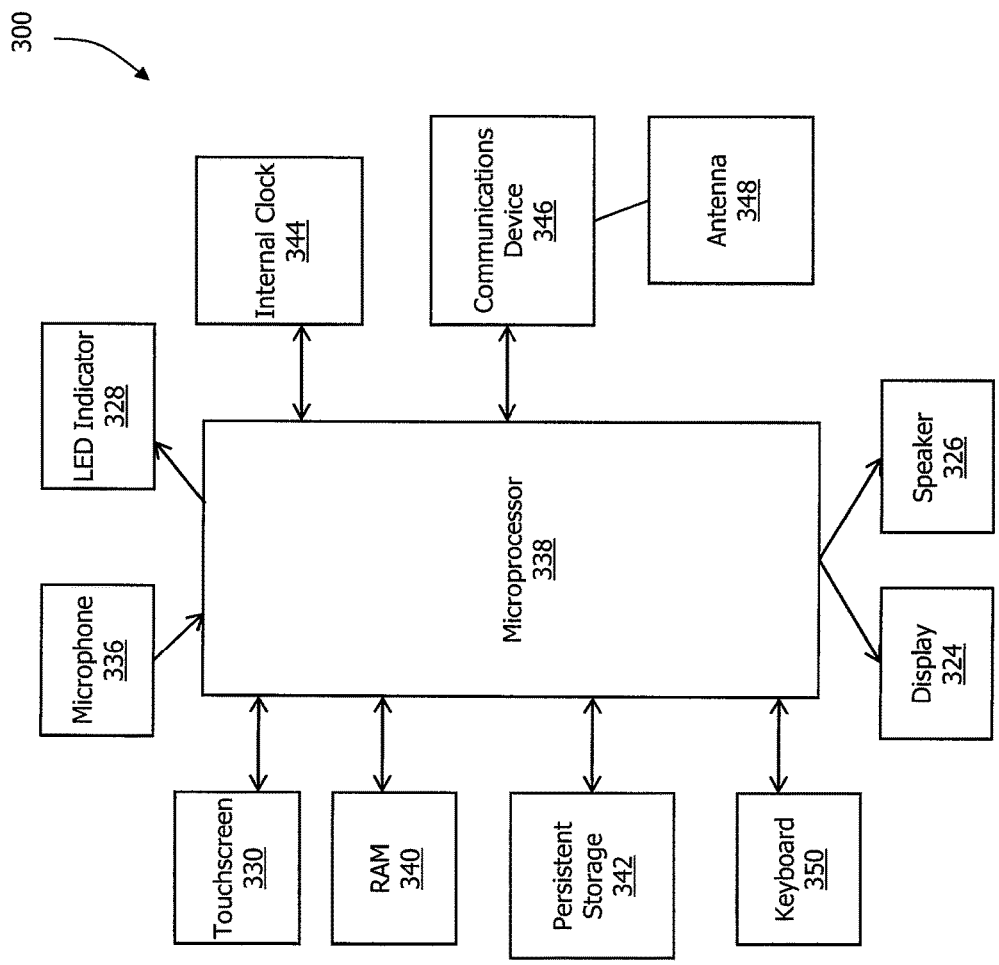
FIG. 3 is a block diagram of one embodiment of the components of computing devices used to implement the subject matter disclosed herein.

FIG. 3 is a block diagram of certain components of an exemplary electronic computing device 300. Computing device 300 is representative of the computing devices (e.g. devices 102) used by users of the intelligent services engine 200 as well as the computing devices in which the intelligent services engine 200, the language generating system 500, and the performance improvement engine 800 and their constituent components reside and by which the intelligent services engine 200, the language generating system 500, and the performance improvement engine 800 and its constituent components are executed. In various exemplary embodiments, the computing device 300 is based on the computing environment and functionality of a hand-held wireless communication device such as device 102. It will be understood, however, that the computing device 300 is not limited to a hand-held wireless communication device. Other electronic devices are possible, such as laptop computers, personal computers, server computers, set-top boxes, electronic voice assistants in vehicles, computing interfaces to appliances, and the like.

Computing device 300 may be based on a microcomputer that includes at least one computer processor (e.g. microprocessor 338) connected to a random access memory (RAM) unit 340 and a persistent storage device 342 that is responsible for various non-volatile storage functions of the computing device 300. Operating system software executable by the microprocessor 338 is stored in the persistent storage device 342, which in various embodiments is flash memory. It will be appreciated, however, that the operating system software can be stored in other types of memory such as read-only memory (ROM). The microprocessor 338 receives input from various input devices including the touchscreen 330, communications device 346, and microphone 336, and outputs to various output devices including the display 324, the speaker 326 and the LED indicator(s) 328. The microprocessor 338 can also be connected to an internal clock 344.

In various embodiments, the computing device 300 is a two-way RF communication device having voice and data communication capabilities. Computing device 300 also includes Internet communication capabilities via one or more networks (e.g. wireless network 106) such as cellular networks, satellite networks, Wi-Fi networks and so forth. Two-way RF communication is facilitated by a communications device 346 that is used to connect to and operate with a data-only network or a complex voice and data network (for example GSM/GPRS, CDMA, EDGE, UMTS or CDMA2000 network, fourth generation technologies, etc.), via the antenna 348.

Although not shown, a battery provides power to all active elements of the computing device 300.

The persistent storage device 342 also stores a plurality of applications executable by the microprocessor 338 that enable the computing device 300 to perform certain operations including the communication operations referred to above. Software for other applications may be provided including, for example, an email application, a Web browser application, an address book application, a calendar application, a profiles application, and others that may employ the functionality of the subject matter disclosed herein. Various applications and services on the computing device 300 may provide APIs (e.g. via service interfaces 118) for allowing other software modules to access the functionality and/or information made available by the APIs (e.g. via service interfaces 118).

Figure 4:
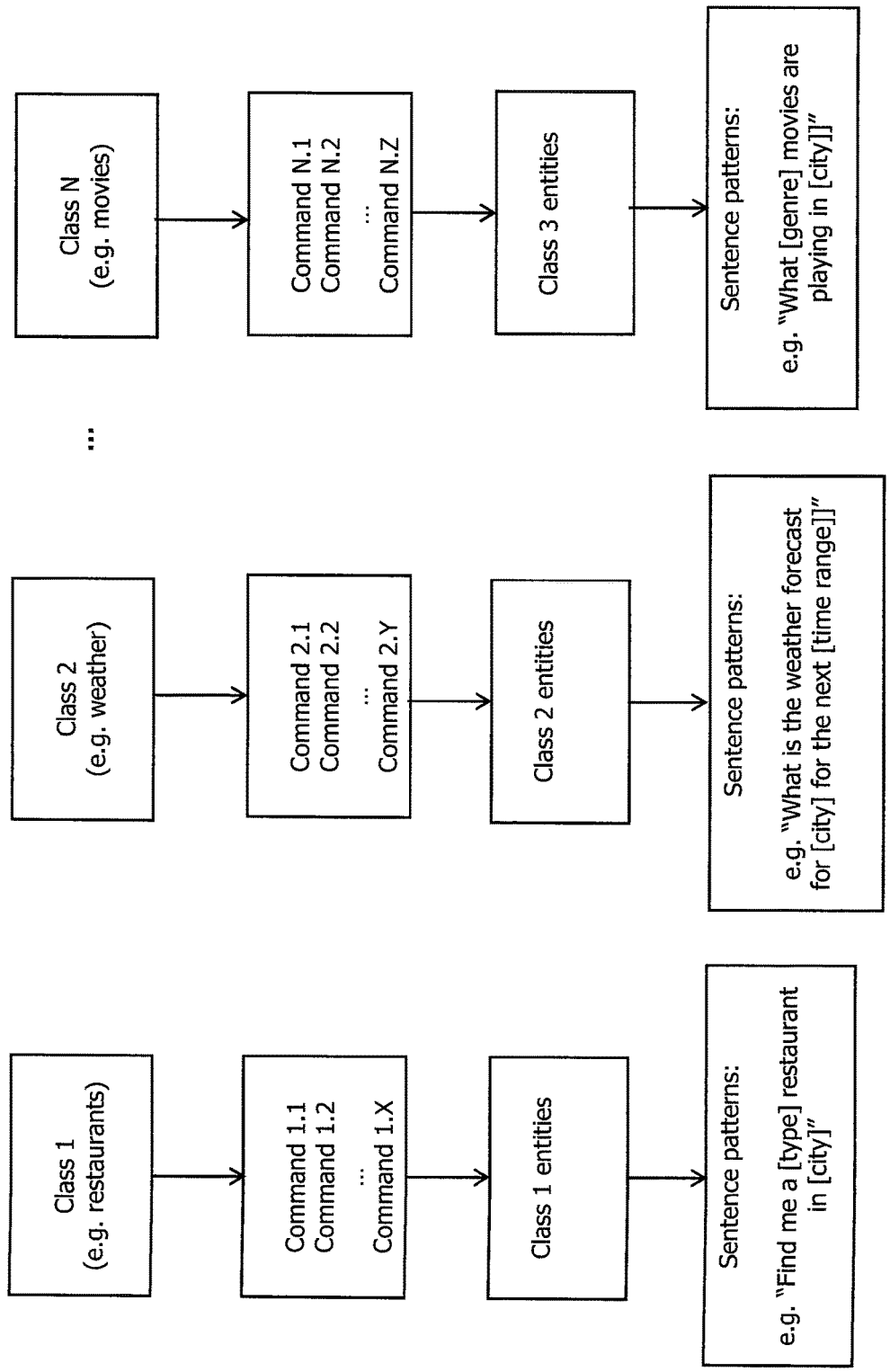
FIG. 4 shows exemplary classes, commands, and entities for a natural language processing system for which language data may be generated.

Referring next to FIG. 4, exemplary classes, commands, entities and sentence patterns for an exemplary NLP system (e.g. comprising application 104, intelligent services engine 200 and associated service interfaces 118) are shown, the intelligent services engine 200 including one or more models (e.g. computational models 217) that may be trained or improved using the data generation process disclosed herein. The system described in FIG. 4 is configured to classify inputs (such as natural language audio queries 152 from users) into class 1, class 2 through to class N. In the embodiment represented in the figure, class 1 corresponds to restaurant-related queries, class 2 corresponds to weather-related queries, and class N relates to movie-related queries. It will be appreciated that the classes 1-N are merely exemplary, and may represent any number of classes that correspond to real-word domains of information according to the product design of the NLP system.

After defining the classes 1-N that the NLP system (e.g. comprising application 104, intelligent services engine 200 and associated service interfaces 118) will support, an architect may then define various commands that will be supported for each class. In FIG. 4, commands 1.1, 1.2 through 1.X are commands associated with class 1, commands 2.1 through 2.Y are commands associated with Class 2, and commands N.1-N.Z are commands associated with class N. The number and type of commands are determined by the architect, and may partly be determined based on information/commands available through external APIs (e.g. external service interfaces 118b). The letters X, Y, N and Z refer to whole numbers that are predetermined by the architect.

Once the classes and commands are determined by the architect, a list of entities is determined for each class which may be compiled by reference to API (e.g. service interfaces 118) documentation. Entities are atomic elements that represent people, places, things, qualifiers, etc. for a particular domain. For example, for audio queries 152 related to a restaurant class, an architect may determine that one or more APIs (e.g. service interfaces 118) allow parameters (entities) related to location, food type/cuisine, price, atmosphere, etc. The architect may determine that such entities should be extracted from restaurant-related audio queries 152 so that information may be provided according to the intention of the user.

Once the classes, commands and entities are decided upon, an architect may define one or more sentence patterns 504 (see FIG. 5) that represent common queries (e.g. audio queries 152) the architect expects will be made by users of the NLP system. Any number of sentence patterns 504 may be defined, with placeholders (tags) used to represent each entity variable. For example, if class 1 is associated with restaurant-related queries, an architect may define sentence patterns 504 such as "Find me a [type] restaurant in [city]". The tags [type] and [city] refer to entity variables that may be substituted with actual entities based on entity sources 510 linked to the particular entities. By substituting the various entity combinations into the sentence patterns 504 created by an architect, a large amount of data may be generated. As an example, if the location/city entity is linked to a data source (e.g. entity source 510) containing thousands of locations, each sentence pattern 504 that includes a location/city entity will result in thousands of sentences being generated that match the sentence pattern 504. For sentence patterns 504 that contain multiple entities, the number of sentences that may be generated therefrom grows significantly. In this way, an architect may generate a large amount of training data for training computer-implemented models (such as classification and entity-extraction computational models 217) from a relatively small number of sentence patterns 504 containing entity variables and an entity source 510 linked to each particular entity.

Figure 5:
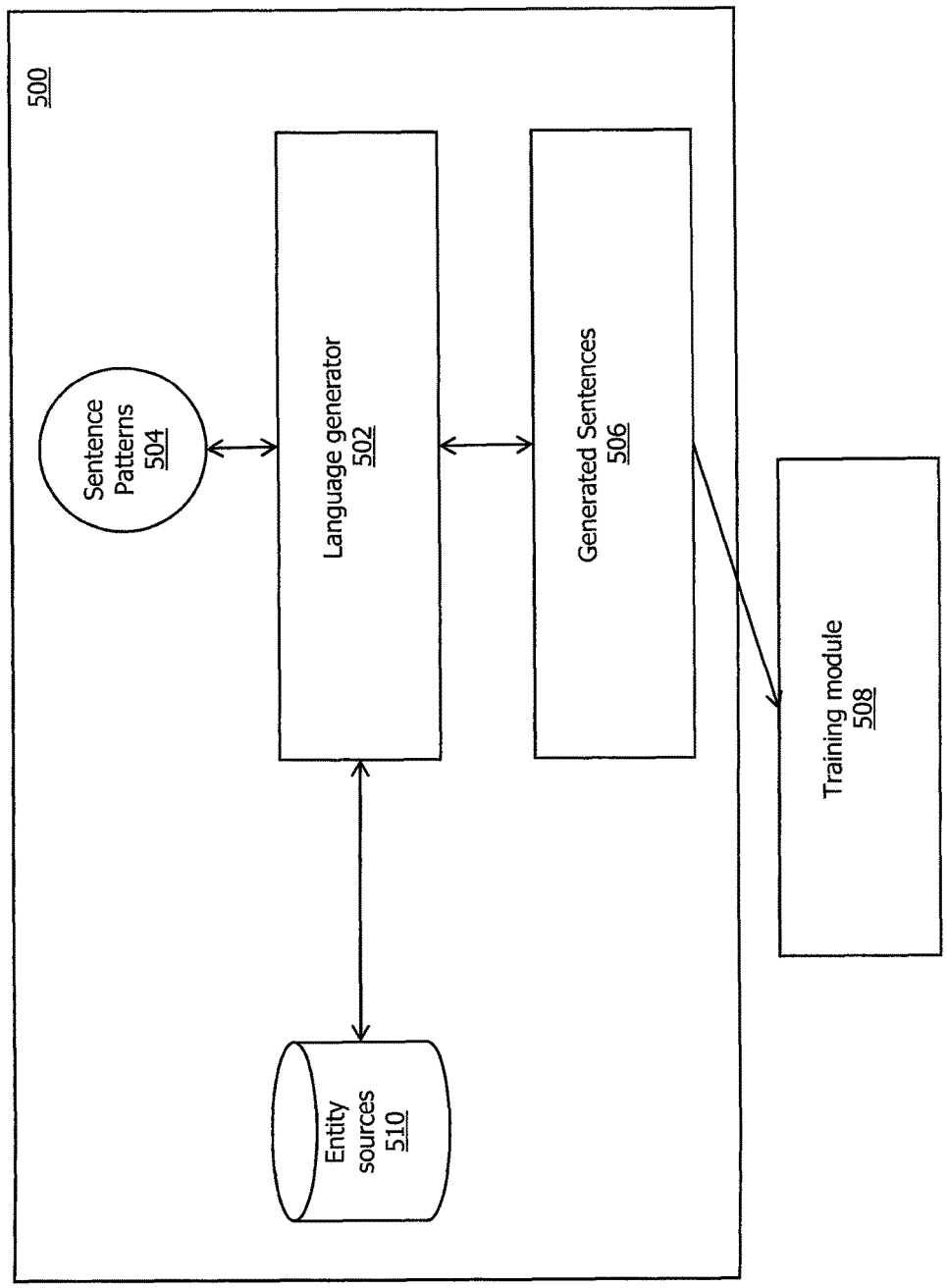
FIG. 5 is a block diagram showing one embodiment of components of an exemplary language generating system.

Reference is next made to FIG. 5 to describe some components of a language generating system 500 in accordance with various embodiments of the subject matter disclosed herein. Language generating system 500 includes a language generator 502 configured to receive sentence patterns 504 that can be generated by an architect as described above. Each unique entity in the sentence patterns 504 is associated with a particular entity source 510. For example, in the context of a restaurant class, a location entity may be associated with an entity source 510 comprising a city list (gazateer), a food type/cuisine may be associated with an entity source 510 comprising a list of cuisines and synonyms (synsets), an atmosphere (e.g. casual, romantic, etc.) entity may be associated with an entity source 510 comprising a discrete list of atmospheres and their synonyms, and so forth. When the language generator 502 is instructed to create a predetermined number of sentences (in one embodiment, the maximum number of permutations that can be generated based on the number of sentence patterns 504 and available entities), the language generator 502 references the one or more entity sources 510 associated with each entity variable embodied in the totality of sentence patterns 504. The language generator 502 may employ one or more algorithms to generate sentences. In one embodiment, the language generator 502 randomly selects a sentence pattern 504 and then randomly selects an entity from the associated entity source 510 for each entity variable in the sentence pattern 504.

The generated sentences 506 are stored electronically in an appropriate structure such as a database. Once the language generator 502 has generated the predetermined number of generated sentences 506, the generated sentences 506 may be provided to a training module 508 so that one or more computer-implemented models (e.g. computational models 217) may be trained or retrained using the generated sentences 506. In one embodiment, each class supported by the NLP system/application is associated with one statistical classification model (e.g. computational model 217) configured to classify incoming queries (e.g. audio query 152) as relating to the particular class. Once the relevant training models are trained or retrained by the generated sentences 506 for each particular model (e.g. computational model 217), the one or more models (e.g. computational models 217) may be deployed to for example a cloud-based infrastructure so that users may interface with the models through a computing device 300 such as device 102 over a wireless network 106. In some embodiments, one or more entity extraction models (e.g. computational models 217) are trained for each domain using the generated sentences 506 related to each domain. The generated sentences 506 may be labeled (i.e. the entities may be tagged according to a predetermined format) before one or more entity extraction models are trained.

Figure 6:
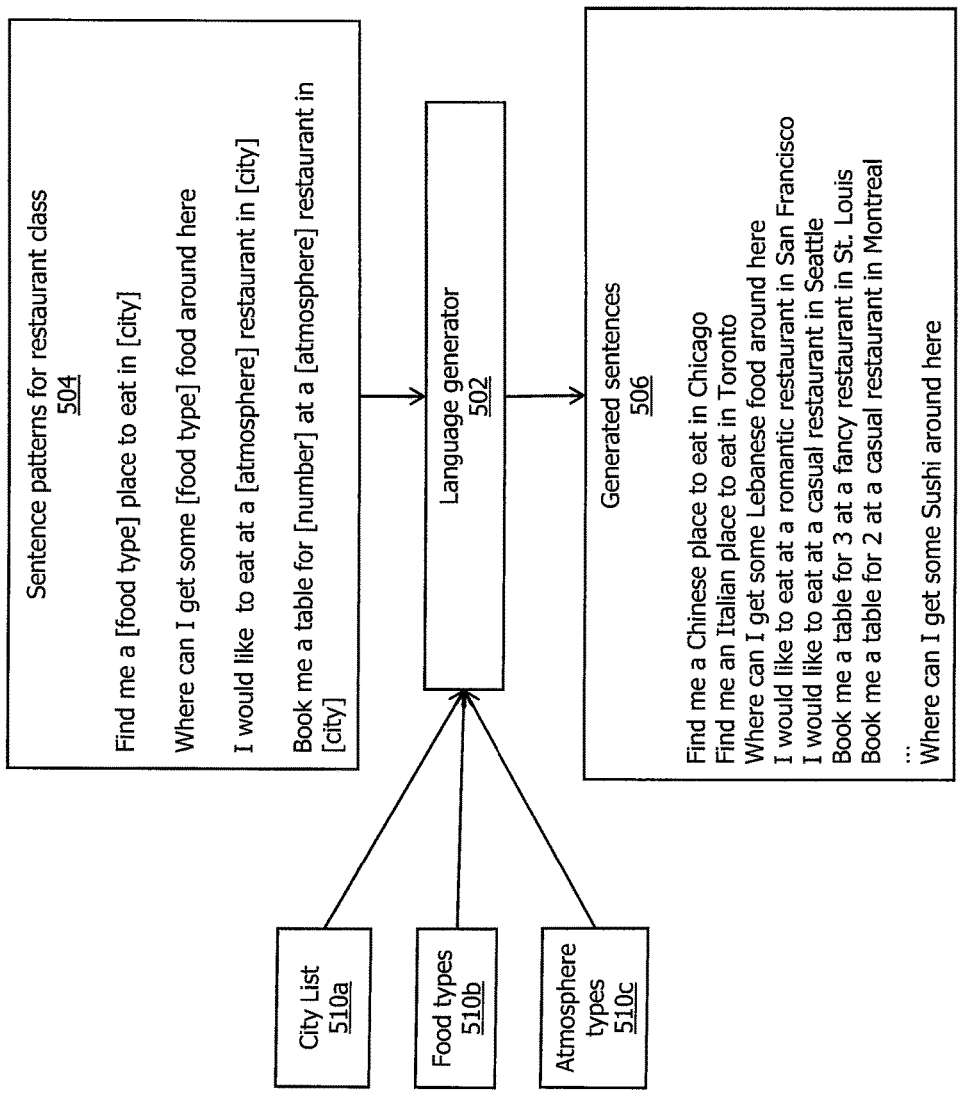
FIG. 6 shows exemplary sentences generated by one embodiment of a language generator using sentence patterns provided by an architect and data from entity sources.

Reference is next made to FIG. 6 to illustrate an exemplary data generation process. The example data generation process in FIG. 6 is related to a restaurant class. One or more statistical models (e.g. computational models 217) of an NLP system (e.g. comprising application 104, intelligent services engine 200 and associated service interfaces 118) are configured to process and classify incoming natural language queries (e.g. audio query 152) as relating to restaurants, and components of the NLP system are configured to interface to external APIs (e.g. external service interfaces 118b) to perform tasks and provide information intended by the users. An architect has generated a plurality of sentence patterns 504 that are representative of the types of queries (e.g. audio queries 152) expected and/or determined (from previous interactions) to be asked by users. The sentence patterns 504 determined by the architect may be only a subset of a larger corpus of sentence patterns 504 provided. As shown, sentence patterns 504 are provided as input to language generator 502 in a computer-implemented system. The language generator 502 references city list 510a, food types 510b and atmosphere types 510c which are data sources (e.g. entity sources 510) for the entities [city], [food type] and [atmosphere] respectively. In various embodiments, city list 510a, food types 510b and atmosphere 510c are data sources (e.g. entity sources 510) comprising a plurality of specific cities, food types and atmospheres respectively that may be used by language generator 502 in creating a predetermined number of generated sentences 506 by substituting particular cities, food types, and atmosphere types in the place of entity variables embodied in each sentence pattern 504.

The language generator 502 creates the generated sentences 506 shown in FIG. 6 which may be used to train/retrain one or more statistical models (e.g. computational models 217) for classifying user queries (e.g. audio query 152) as relating to the restaurant class and/or for extracting entities from incoming natural language queries (e.g. audio queries 152). As can be seen, the subset of generated sentences 506 are related to the sentence patterns 504, but include specific entities from the city list 510a, food types 510b and atmosphere types 510c (i.e. specific entities from the entity sources 510).

Figure 7:
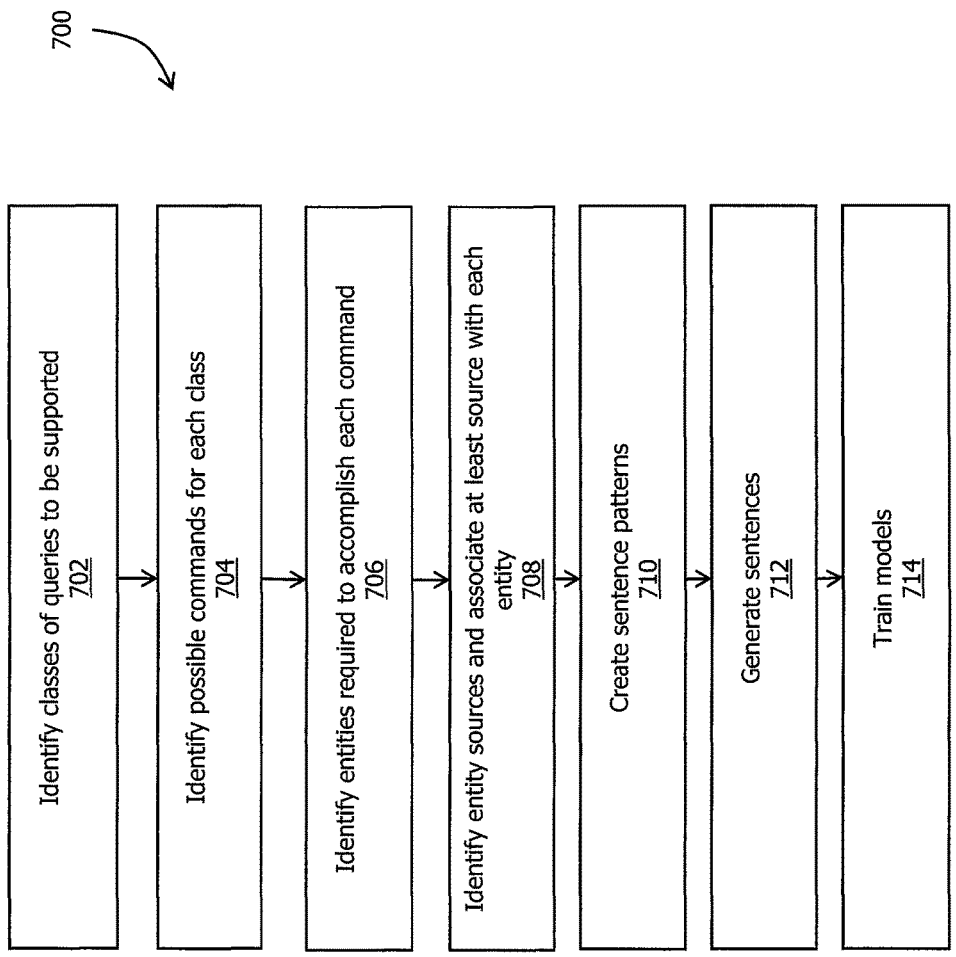
FIG. 7 is a flow diagram of exemplary operations for generating natural language training data for a system such as the intelligent services engine of FIG. 2.

Reference is next made to FIG. 7 to describe exemplary methods (e.g. operations 700) that may be performed to generate training data for a particular NLP system (e.g. comprising application 104, intelligent services engine 200 and associated service interfaces 118). In various embodiments, the methods (e.g. operations 700) and variations thereof may be implemented in a computer application associated with a user interface for allowing the architect to initiate the steps of the method (e.g. operations 700), as well as to set various parameters relating to particular steps and the process (e.g. operations 700) in general. For a new NLP application (e.g. application 104), an architect first determines at step 702 the classes (domains) of queries (e.g. audio query 152) that are to be supported. For an existing application (e.g. application 104), the architect determines at step 702 the new classes of queries that will be supported and/or the classification models (e.g. computational models 217) that already exist within the application (e.g. application 104) that the architect desires to improve by generating additional training data.

At step 704, the architect determines the possible commands for each class that are to be supported by the application (e.g. application 104). At step 706, the architect identifies the particular entities that are necessary to be extracted from the commands (e.g. audio queries 152) in order to accomplish the task/provide the information intended by the user. To identify particular entities, an architect may consult one or more APIs (e.g. service interfaces 118) and/or data feeds that are configured to provide information relating to a particular class. It may be found that particular APIs (e.g. service interfaces 118) allow or require certain information as parameters to method calls, and therefore are to be extracted from user queries (e.g. audio queries 152) relating to the particular class(es). At step 708, at least one entity source 510 is provided and associated with each entity that will be extracted for queries (e.g. audio queries 152) classified in a particular class. The architect may enter the entities for each class and make associations between entities and data sources (e.g. entity sources 510) using a data generation user interface in communication with a data generator which may be embodied in a software object and implemented by a computer processor. At step 710, an architect may create a plurality of sentence patterns 504 that may be representative of the types of queries (e.g. audio queries 152) expected to be asked by users of the NLP application 104. At step 712, various permutations of sentences may be generated based on the sentence patterns 504 and the entity sources 510. Finally, at step 714, one or more statistical models (e.g. computational models 217) may be trained or retrained (e.g. via the training module 508) using the generated sentences 506. The models may then be deployed (for example, in a cloud-based infrastructure) so that users may interact with the NLP application from a variety of computing devices (e.g. device 102) over a wireless network 106 such as the Internet.

It will be appreciated that the terms architect and developer refer to individuals that may contribute to the data generation method and system disclosed herein; however, skilled persons in the art will understand that any individual suitably trained may employ the data generation method and system in the context of an NLP system or any other system that requires labeled data to train one or more classification and/or entity extraction models (e.g. computational models 217).

Clustering

Figure 8:
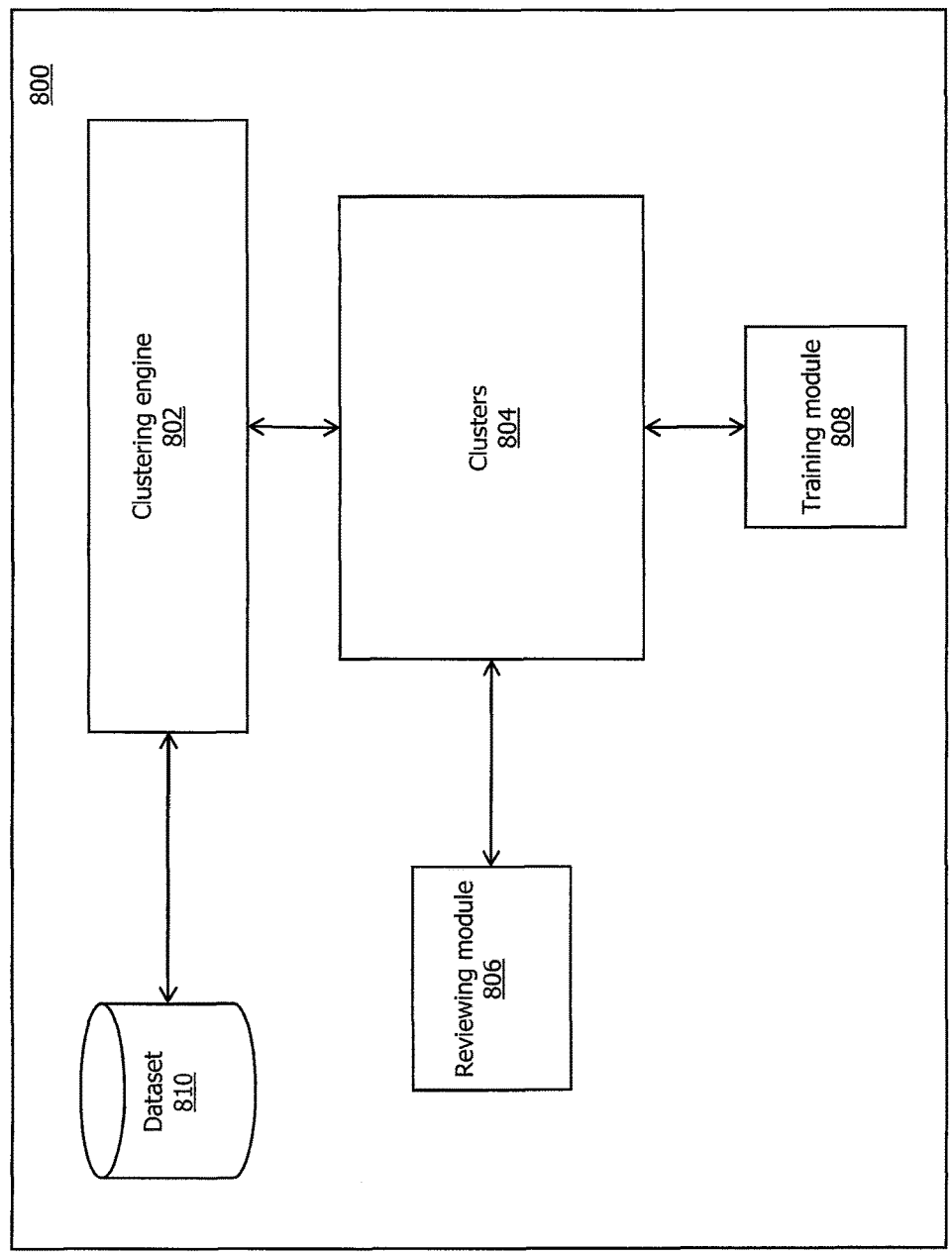
FIG. 8 shows components of an exemplary performance improvement engine that may be used to improve the performance of one or more models trained using generated sentences.

FIG. 8 illustrates a performance improvement engine 800 for improving a classification system, such as a statistical classification system that accepts natural language voice queries (e.g. audio queries 152) as inputs. A clustering engine 802 may create one or more clusters 804 of queries (e.g. audio queries 152) where the queries in each cluster 804 are related in some way. A reviewing module 806 may be employed to determine whether each cluster 804 relates to an existing category supported by the classification system, a new category that can be supported by the classification system by training statistical models (e.g. computational models 217) with the data from the cluster 804, is ambiguous, or is not useful to improve the classification system. For clusters 804 determined to be useful for improving the system, the data in the clusters 804 may be added to an existing training set or used as a training set to train new statistical models (e.g. computational models 217).

Figure 9:
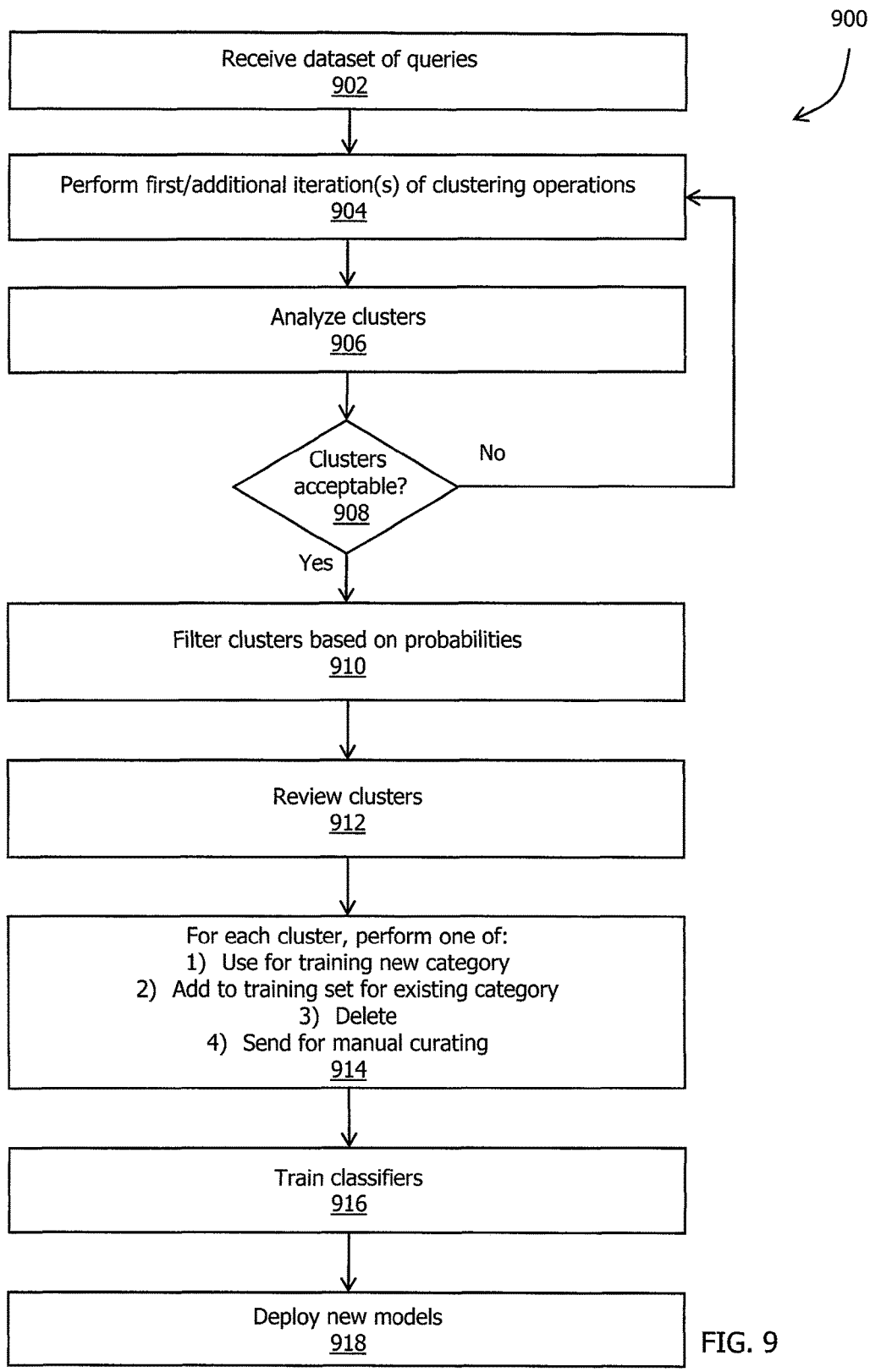
FIG. 9 is a flow diagram of exemplary operations for clustering user-provided queries to improve the models of a natural language processing system.

Reference is next made to FIG. 9 to illustrate exemplary operations 900 for improving an existing classification system (e.g. comprising computational models 217), such as a statistical classification system for processing natural language queries (e.g. audio queries 152). At step 902, a dataset of queries is received by the performance improvement engine 800. The dataset of queries may be comprised of natural language queries posed by users of the classification system as they interacted with the system. At step 904, a first iteration of clustering operations is performed on the dataset. Any suitable clustering or combination of clustering techniques may be used such as K-means, Lloyd's algorithm, other distance measures, etc. In various embodiments, Naïve Bayes clustering techniques are used to cluster the data in the dataset.

At step 906, the clusters 804 may be analyzed manually or automatically to determine if subsequent clustering iterations are to be performed. If at step 908 it is determined that subsequent clustering operations are desired, the process continues at step 904 where additional clusters 804 may be created from the clusters 804 already created. If subsequent clustering operations 900 are not required (or desired) the process continues to step 910 where clusters 804 (or particular elements of each cluster 804) may be filtered out based on the probability that each data element belongs to a particular cluster. The threshold probability may be set by a user of the performance improvement engine 800 to filter out clusters 804 that do not have the requisite "density" or elements of a cluster 804 that are determined to be below the desired probability threshold.

In various embodiments, the clustering operations 900 performed at step 904 continue until the clusters 804 at a subsequent clustering iteration are identical to the clusters 804 at a previous clustering operation. In such an embodiment, step 908 may be skipped if desired by the user managing the performance enhancing operations 900.

At step 912, the clusters generated by the clustering engine 802 may be reviewed manually and/or automatically to determine how the data in each cluster 804 may be used to improve the performance of the classification system. In various embodiments, a user reviews each cluster 804 at step 914 manually and determines that each cluster 804 is either: 1) useful for training a new category that is currently unsupported by the classification system; 2) useful for adding to an existing training set for an existing model so the model may be retrained; 3) ambiguous and a candidate for manual curating and 4) not currently useful for improving the classification system.

At step 916, the data from clusters 804 determined to be useful for improving the classification system is directed to the training module 808 (which can comprise training module 508) so that the related models (e.g. computational models 217) may be retrained and new models trained. In various embodiments, the training module 808 automatically retrains existing models (e.g. computational models 217) with the additional training data provided by the clusters 804 and the training module 808 automatically trains new models (e.g. computational models 217) so that the classification system may recognize additional classes. In other embodiments, the training module 808 is operated manually by a user (such as an administrator or other person who is responsible for administering the model). The user may select, via a training user interface, which models are to be retrained using the additional data provided by the clustering engine 802 and whether new models are to be created using data provided by the clustering engine 802.

Generated sentences 506, existing and/or retrained and/or new models (e.g. computational models 217), and other data can be exchanged between the intelligent services engine 200, the language generating system 500, and/or the performance improvement engine 800 over a wired or wireless network (e.g. wireless network 106). Upon receiving a retrained statistical model (e.g. computational model 217), the intelligent services engine 200 can be configured to implement the model in place of the previous model. Likewise, the intelligent services engine 200 can be configured to implement a new statistical model (e.g. computational model 217) for deciphering previously unrecognizable audio queries 152 once received from the performance improvement engine 800.

The foregoing description has been presented for the purpose of illustration; it is not intended to be exhaustive or to limit the claimed subject matter to the precise forms disclosed. Persons skilled in the relevant art can appreciate that many modifications and variations are possible in light of the above disclosure. As such the embodiments disclosed herein are intended to be illustrative and should not be read to limit the scope of the claimed subject matter set forth in the following claims.

Some portions of this description describe embodiments of the claimed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations or processes described herein may be performed or implemented with one or more hardware or software modules, alone or in combination with other devices. In one embodiment, a software module is implemented with a computer program product comprising computer-readable medium containing computer program code, which can be executed by a computer processor for performing any or all of the steps, operations, or processes described.

Embodiments provided herein may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

What is claimed is:

1. A computer-implemented method for generating a training database comprising training data for training one or more models implemented in a natural language processing system, the method comprising:
   receiving a training set of queries for training classes of the natural language processing system;
   analyzing the training set of queries to identify one or more clusters of related queries associated with one or more classes of a set of classes;
   receiving, at a language generator, a sentence pattern of a plurality of sentence patterns, wherein the received sentence pattern is associated with a selected class from the set of classes, wherein the received sentence pattern comprises at least one command corresponding to the selected class associated with at least one cluster, wherein the received sentence pattern comprises one or more entity variables associated with the at least one command, and wherein each entity variable is associated with a definition and represented by a placeholder within the received sentence pattern;
   providing a user interface for identifying one or more entity sources;
   receiving a selection, via the user interface, requesting a plurality of entities associated with the selected class from an entity source of the one or more entity sources, wherein the entity source includes a database storing the plurality of entities, each entity configured to replace the one or more entity variables in accordance with the definition of each entity variable;
   receiving, at the language generator, the plurality of entities corresponding to the selected class associated with the received sentence pattern;
   selecting at least a first entity and a second entity from the plurality of entities corresponding to a definition of at least one entity variable of the received sentence pattern associated with the selected class;
   automatically generating, at the language generator, a plurality of distinct natural language sentences to augment the training data by permutative replacement of the placeholder representing at least one entity variable of the received sentence pattern with at least the first entity and the second entity, wherein the plurality of distinct natural language sentences is maintained for training one or more models associated with the selected class;
   storing the plurality of distinct natural language sentences in the training database; and
   transmitting the training database to a training computer, the training computer configured to train the one or more models associated with the selected class, wherein generating the plurality of distinct natural language sentences comprises randomly selecting the received sentence pattern associated with the selected class from the plurality of sentence patterns, and for each entity variable in the received sentence pattern, randomly selecting the first entity and the second entity associated with the selected class matching the definition of the entity variable.

2. The method of claim 1 wherein the plurality of distinct natural language sentences is a maximum number of distinct natural language sentences that can be generated based on the received sentence pattern, the one or more entity variables, and the plurality of entities.

3. The method of claim 1 wherein the plurality of distinct natural language sentences match one or more input queries of a single class.

4. The method of claim 1 further comprising using the plurality of distinct natural language sentences to train one or more models to be implemented in a natural language processing system.

5. The method of claim 1, wherein the one or more models are configured to perform at least one of: classifying an input query into the selected class from the set of classes, identifying the input query as a specific command, and extracting one or more entities from the input query.

6. The method of claim 1 further comprising:
receiving a plurality of input queries comprising natural language queries;
clustering the plurality of input queries corresponding to the set of classes;
selecting clusters for training the one or more models; and
associating the selected clusters of input queries with the plurality of distinct natural language sentences to train the one or more models.

7. A non-transitory computer-readable medium for generating a training database comprising training data for training one or more models implemented in a natural language processing system, the non-transitory computer-readable medium comprising instructions that, when executed, cause a computer to perform operations comprising:
receiving a training set of queries for training classes of the natural language processing system;
analyzing the training set of queries to identify one or more clusters of related queries associated with one or more classes of a set of classes;
receiving, at a language generator, a sentence pattern of a plurality of sentence patterns, wherein the received sentence pattern is associated with a selected class from the set of classes, wherein the received sentence pattern comprises at least one command corresponding to the selected class associated with at least one cluster, wherein the received sentence pattern comprises one or more entity variables associated with the at least one command, and wherein each entity variable is associated with a definition and represented by a placeholder within the received sentence pattern;
providing a user interface for identifying one or more entity sources;
receiving a selection, via the user interface, requesting a plurality of entities associated with the selected class from an entity source of the one or more entity sources, wherein the entity source includes a database storing the plurality of entities, each entity configured to replace the one or more entity variables in accordance with the definition of each entity variable;
receiving, at the language generator, the plurality of entities corresponding to the selected class associated with the received sentence pattern;
selecting at least a first entity and a second entity from the plurality of entities corresponding to a definition of at least one entity variable of the received sentence pattern associated with the selected class;
automatically generating, at the language generator, a plurality of distinct natural language sentences to augment the training data by permutative replacement of the placeholder representing at least one entity variable of the received sentence pattern with at least the first entity and the second entity, wherein the plurality of distinct natural language sentences is maintained for training one or more models associated with the selected class;
storing the plurality of distinct natural language sentences in the training database; and
transmitting the training database to a training computer, the training computer configured to train the one or more models associated with the selected class, wherein generating the plurality of distinct natural language sentences comprises randomly selecting the received sentence pattern associated with the selected class from the plurality of sentence patterns, and for each entity variable in the received sentence pattern, randomly selecting the first entity and the second entity associated with the selected class matching the definition of the entity variable.

8. The non-transitory computer-readable medium of claim 7 wherein the plurality of distinct natural language sentences is a maximum number of sentences that can be generated based on the received sentence pattern, the one or more entity variables, and the plurality of entities.

9. The non-transitory computer-readable medium of claim 7 wherein the plurality of distinct natural language sentences match one or more input queries of a single class.

10. The non-transitory computer-readable medium of claim 7 wherein the operations further comprise using the plurality of distinct natural language sentences to train one or more models to be implemented in a natural language processing system.

11. The non-transitory computer-readable medium of claim 7, wherein the one or more models are configured to perform at least one of: classifying an input query into the selected class from the set of classes, identifying the input query as a specific command, and extracting one or more entities from the input query.

12. The non-transitory computer-readable medium of claim 7, wherein the operations further comprise:
receiving a plurality of input queries comprising natural language queries;
clustering the plurality of input queries corresponding to the set of classes;
selecting clusters for training the one or more models; and
associating the selected clusters of input queries with the plurality of distinct natural language sentences to train the one or more models.

13. A computer system for generating a training database comprising training data for training one or more models implemented in a natural language processing system, the system comprising:
one or more processors;
a memory coupled to the one or more processors and storing instructions and data, the instructions for directing the one or more processors of the computer system to:
receive a training data set of queries for training classes of the natural language processing system;
analyze the training set of queries to identify one or more clusters of related queries associated with one or more classes of set of classes;

receive, at a language generator, a sentence pattern of a plurality of sentence patterns, wherein the received sentence pattern is associated with a selected class from the set of classes, wherein the received sentence pattern comprises at least one command corresponding to the selected class associated with at least one cluster, and wherein the received sentence pattern comprises one or more entity variables associated with the at least one command, and wherein each entity variable is associated with a definition and represented by a placeholder within the received sentence pattern;

provide a user interface for identifying one or more entity sources;

receive a selection, via the user interface, requesting a plurality of entities associated with the selected class from an entity source of the one or more entity sources, wherein the entity source includes a database storing the plurality of entities, each entity configured to replace the one or more entity variables in accordance with the definition of each entity variable;

receive, at the language generator, the plurality of entities corresponding to the class associated with the received sentence pattern;

select at least a first entity and a second entity from the plurality of entities corresponding to a definition of at least one entity variable of the received sentence pattern associated with the selected class;

automatically generate, at the language generator, a plurality of distinct natural language sentences to augment the training data by permutative replacement of the placeholder representing at least one entity variable of the received sentence pattern with at least the first entity and the second entity, wherein the plurality of distinct natural language sentences is maintained for training one or more models associated with the selected class;

store the plurality of distinct natural language sentences in the training database; and transmit the training database to a training computer, the training computer configured to train the one or more models associated with the selected class, wherein generating the plurality of distinct natural language sentences comprises randomly selecting the received sentence pattern associated with the selected class from the plurality of sentence patterns, and for each entity variable in the sentence pattern, randomly selecting the first entity and the second entity associated with the selected class matching the definition of the entity variable.

14. The computer system of claim 13 further configured to:

receive a plurality of input queries comprising natural language queries;

cluster the plurality of input queries corresponding to the set of classes;

select clusters for training the one or more models; and associate the selected clusters of input queries with the plurality of distinct natural language sentences to train the one or more models.

15. The computer system of claim 13, wherein the plurality of distinct natural language sentences is a maximum number of distinct natural language sentences that can be generated based on the received sentence pattern, the one or more entity variables, and the plurality of entities.

16. The computer system of claim 13, wherein the plurality of distinct natural language sentences match one or more input queries of a single class.

17. The computer system of claim 13, further comprising using the plurality of distinct natural language sentences to train one or more models to be implemented in a natural language processing system.

18. The computer system of claim 13, wherein the one or more models are configured to perform at least one of: classifying an input query into the selected class from the set of classes, identifying the input query as a specific command, and extracting one or more entities from the input query.

* * * * *